United States Patent
Wandeler et al.

(10) Patent No.: US 9,885,593 B2
(45) Date of Patent: Feb. 6, 2018

(54) METHOD FOR VERIFYING THE RELIABILITY OF MEASUREMENT DATA OF AN ULTRASONIC FLOW MEASUREMENT BASED ON THE TRAVEL-TIME DIFFERENCE METHOD AND ULTRASONIC FLOW MEASUREMENT DEVICE

(71) Applicant: Endress + Hauser Flowtec AG, Reinach (CH)

(72) Inventors: Frank Wandeler, Remigen (CH); Aurele Fleury, Aesch (CH)

(73) Assignee: Endress + Hauser Flowtec AG, Reinach (CH)

( * ) Notice: Subject to any disclaimer, the term of this patent is extended or adjusted under 35 U.S.C. 154(b) by 218 days.

(21) Appl. No.: 14/652,331

(22) PCT Filed: Nov. 25, 2013

(86) PCT No.: PCT/EP2013/074586
§ 371 (c)(1),
(2) Date: Oct. 21, 2015

(87) PCT Pub. No.: WO2014/095238
PCT Pub. Date: Jun. 26, 2014

(65) Prior Publication Data
US 2016/0069718 A1 Mar. 10, 2016

(30) Foreign Application Priority Data
Dec. 18, 2012 (DE) .......... 10 2012 112 516

(51) Int. Cl.
*G01F 1/66* (2006.01)
(52) U.S. Cl.
CPC .............. *G01F 1/66* (2013.01); *G01F 1/667* (2013.01)

(58) Field of Classification Search
CPC .................. G01F 1/66; G01F 1/667
See application file for complete search history.

(56) References Cited

U.S. PATENT DOCUMENTS

| 3,818,757 A | * | 6/1974 | Brown | G01F 1/667 73/861.28 |
| 4,663,977 A | * | 5/1987 | Vander Heyden | G01F 15/046 700/282 |

(Continued)

FOREIGN PATENT DOCUMENTS

| CN | 1585890 A | 2/2005 |
| CN | 1846178 A | 10/2006 |

(Continued)

OTHER PUBLICATIONS

English Translation of International Preliminary Report on Patentability, WIPO, Geneva, dated Jul. 2, 2015.

(Continued)

*Primary Examiner* — David Bolduc
(74) *Attorney, Agent, or Firm* — Bacon & Thomas, PLLC

(57) ABSTRACT

A method for verifying the reliability of ascertained measurement data of an ultrasonic, flow measurement made according to the travel-time difference method, wherein an ultrasonic flow measuring device having at least two ultrasonic transducers is used to transmit and receive ultrasonic signals inclined in or counter to a flow direction of a measured medium. A first ultrasound disturbance signal is registered within a first time window before receiving a first ultrasound wanted signal, and a second ultrasound disturbance signal is registered within a second time window before receiving a second ultrasound wanted signal. A quality criterion is ascertained for evaluating the measurement uncertainty of a measured value proportional to the travel-time difference ascertained from the first and second ultrasound wanted signals, wherein the ascertaining of the (Continued)

quality criterion includes a difference forming between the first and second disturbance signals.

7 Claims, 5 Drawing Sheets

(56) References Cited

U.S. PATENT DOCUMENTS

| | | | | |
|---|---|---|---|---|
| 5,600,073 | A * | 2/1997 | Hill | G01B 5/28 73/30.03 |
| 5,741,980 | A * | 4/1998 | Hill | G01B 5/28 73/861.04 |
| 6,098,467 | A * | 8/2000 | Wallen | G01F 1/662 73/861.28 |
| 6,158,288 | A * | 12/2000 | Smith | G01F 1/667 73/861.18 |
| 6,209,388 | B1 * | 4/2001 | Letton | G01F 1/74 73/61.79 |
| 6,287,260 | B1 * | 9/2001 | Hascoet | A61B 8/06 600/454 |
| 6,907,792 | B2 | 6/2005 | Ohnishi | |
| 6,950,768 | B2 | 9/2005 | Freund | |
| 7,096,135 | B2 | 8/2006 | Ao | |
| 7,254,494 | B2 | 8/2007 | Botter | |
| 7,885,790 | B2 | 2/2011 | Straub | |
| 2001/0037676 | A1 * | 11/2001 | Chang | G01F 1/66 73/114.33 |
| 2001/0037688 | A1 * | 11/2001 | Chang | G01F 1/66 73/861.29 |
| 2002/0123852 | A1 * | 9/2002 | Gysling | G01F 1/66 702/100 |
| 2003/0125902 | A1 * | 7/2003 | Freund, Jr. | G01F 1/667 702/178 |
| 2004/0050176 | A1 | 3/2004 | Ohnishi | |
| 2004/0261539 | A1 | 12/2004 | Umekage et al. | |
| 2005/0055171 | A1 | 3/2005 | Freund et al. | |
| 2005/0209795 | A1 | 9/2005 | Ao et al. | |
| 2006/0123922 | A1 * | 6/2006 | Froehlich | G01F 1/66 73/861.29 |
| 2006/0243065 | A1 | 11/2006 | Sakai et al. | |
| 2006/0259260 | A1 * | 11/2006 | Frohlich | G01F 1/66 702/100 |
| 2009/0240453 | A1 | 9/2009 | Straub | |
| 2013/0080080 | A1 * | 3/2013 | Forbes | G01F 1/667 702/48 |
| 2013/0291649 | A1 * | 11/2013 | Groeschel | G01F 1/667 73/861.18 |
| 2013/0340519 | A1 * | 12/2013 | Kurth | G01F 7/00 73/196 |

FOREIGN PATENT DOCUMENTS

| | | |
|---|---|---|
| CN | 1864047 A | 11/2006 |
| CN | 1977149 A | 6/2007 |
| CN | 101978351 A | 2/2011 |

OTHER PUBLICATIONS

International Search Report EPO, The Netherlands, dated Mar. 3, 2014.

German Search Report, German PTO, Munich, dated Aug. 21, 2013.

* cited by examiner

METHOD FOR VERIFYING THE RELIABILITY OF MEASUREMENT DATA OF AN ULTRASONIC FLOW MEASUREMENT BASED ON THE TRAVEL-TIME DIFFERENCE METHOD AND ULTRASONIC FLOW MEASUREMENT DEVICE

TECHNICAL FIELD

The present invention relates to a method for verifying the reliability of measurement data of an ultrasonic, flow measurement based on the travel-time difference method and to an ultrasonic, flow measuring device.

BACKGROUND DISCUSSION

Ultrasonic, flow measuring devices are widely applied in process and automation technology. They permit simple determination of volume flow and/or mass flow in a pipeline.

According to latest investigations, involved in ultrasonic flow measurements are ultrasound scattering signals, which do not travel exclusively via the tube wall of a measuring tube of an ultrasonic flow measuring device but instead can be found at certain locations propagating through the measured medium. This class of disturbance signals exhibits a high degree of fluctuation relative to the measurement error even in the case of small temperature changes. As a result, these disturbance signals are difficult to compensate.

SUMMARY OF THE INVENTION

Starting from this basic situation, an object of the present invention is to verify the reliability of ascertained measurement data of an ultrasonic measurement with reference to the occurrence and extent of the aforementioned temperature sensitive disturbance signals.

The present invention achieves this object by providing a method and an ultrasonic flow measuring device.

According to the invention, a method for verifying the reliability of ascertained measurement data of an ultrasonic, flow measurement made according to the travel-time difference method includes steps as follows: transmitting and receiving ultrasonic signals inclined in or counter to a flow direction of a measured medium using an ultrasonic flow measuring device with at least two ultrasonic transducers, registering a first ultrasound disturbance signal within a first time window before receiving a first ultrasound wanted signal, which propagates essentially through the measured medium between the transducers, wherein the first ultrasound disturbance signal propagates at least at some locations through the measured medium between the transducers; registering a second ultrasound disturbance signal within a second time window before receiving a second ultrasound wanted signal, which propagates essentially through the measured medium between the transducers, wherein the first and second ultrasound wanted signals are associated respectively with two ultrasonic signals, which are sent in opposing directions through the medium, and ascertaining a quality criterion for evaluating the measurement uncertainty of a measured value proportional to the travel-time difference ascertained from the first and second ultrasound wanted signals.

By ascertaining the quality criterion as a term expressing the extent of the asymmetric tube waves, a verification of the ultrasonic measurement, as a whole, and the ascertained individual measurement data is achieved.

A verification can occur either by evaluation of the quality criterion by the end user or by an evaluating unit, for example, with acoustic or optical output.

Advantageous embodiments of the invention are subject matter of the dependent claims.

Additionally, the evaluating unit can, after verification of the quality criterion, advantageously decide based on predetermined desired values whether an ascertained individual measured value is sufficiently reliable. The reliability/unreliability of the individual measured value can be indicated, for example, by visually different displays. Thus, unreliable individual measured values can be displayed, for example, red and reliable individual measured values black or green.

It is advantageous when the quality criterion is ascertained by a comparison operation, which includes ascertaining the mean squared difference between the first and second ultrasound disturbance signals, since this gives an improved error estimation.

Ideally, the first and second time windows are equally large, so that no additional measuring effort and energy use for a longer time window is expended, where no comparison is possible anyway.

According to the invention, an ultrasonic flow measuring device includes at least two ultrasonic transducers and an evaluating apparatus, which is embodied for verifying the reliability of ascertained measurement data of an ultrasonic, flow measurement made according to the travel-time difference method.

It is advantageous when the ultrasonic flow measuring device has a display unit for output of a currently ascertained measurement uncertainty.

A method of the invention for determining a flow velocity or a flow of a measured medium using an ultrasonic flow measuring device having at least two ultrasonic transducers, wherein ultrasonic signals are transmitted and received inclined in or counter to a flow direction of a measured medium, wherein a compensation of a measurement error brought about by ultrasound disturbance signals, which propagate between the ultrasonic transducers essentially outside of the measured medium, includes steps as follows:

a) transmitting a sequence of ultrasound transmission signals along a measuring path with a modulated pulse repetition time, b) receiving a sequence of ultrasound received signals, comprising ultrasound wanted signals, wherein, in each case, an ultrasound wanted signal is superimposed by at least one ultrasound disturbance signal, and c) averaging the ultrasound received signals of a sequence or a value derived therefrom for reducing a measured value error caused by the ultrasound disturbance signals.

The ultrasound transmission signals can be transmitted sequentially in one direction. Alternatively, the transmission direction of the ultrasonic pulses can be changed as much as desired, wherein, however, it must be assured that the same modulation pattern is used for the two transmission directions.

Reduction of the measured value error occurs especially in the case of ultrasound disturbance signals, which come from preceding transmission pulses.

DETAILED DISCUSSION IN CONJUNCTION WITH THE DRAWINGS

The invention and the problem to which it is directed will now be explained in greater detail based on an example of an embodiment of an ultrasonic transducer arrangement with an ultrasonic transducer pair. Known also are ultrasound transducer arrangements with more than two ultrasonic transducers, and the present invention is likewise applicable in those situations.

In the case of ultrasonic, flow measurement according to the travel time principle, ultrasonic pulses are sent at a certain angle to the flow direction through the medium to be measured. This occurs, for example, using two ultrasonic transducers aligned with one another, wherein each ultrasonic transducer can function in a first operating mode as an ultrasonic transmitter or in a second operating mode as an ultrasonic receiver.

Figure 8:
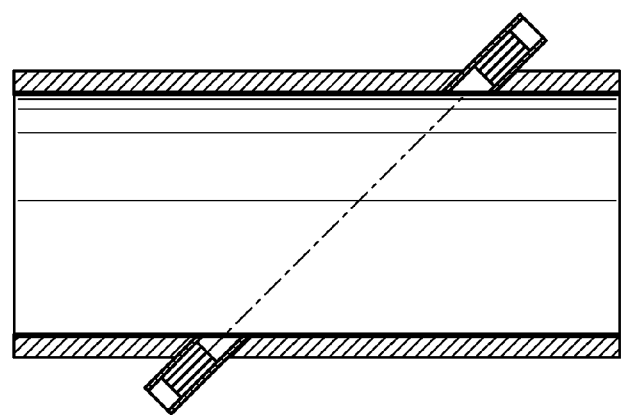
FIG. 8 shows a schematic illustration of an ultrasonic flow measuring device according to the state of the art.

In the case of the above described ultrasonic transducer arrangement with two ultrasonic transducers, also referred to as an ultrasonic transducer pair, the ultrasonic transducers are alternately excited with an electrical signal, whereby an ultrasonic pulse is radiated. A typical ultrasonic flow measuring device, such as that known from WO 2009068691 A1, is shown in FIG. 8 for illustration of the measuring principle. The ultrasonic signal travels through the measured medium located in the measuring tube and also through the material of the measuring tube.

Known also are clamp-on, ultrasonic, flow measuring devices. In this case, there is, besides the transmission through the measuring tube wall, in given cases, also signal transmission through additional coupling media (e.g. ultrasound coupling paste), with which the ultrasonic transducer is coupled with the measuring tube of an ultrasonic flow measuring device and/or through a measuring tube lining (in the case of corrosive measured media). The respectively other ultrasonic transducer transduces the incoming ultrasonic wave back into an electrical signal, which is amplified and further processed.

The two ultrasonic transducers will be referred to as ultrasonic transducer A and ultrasonic transducer B. Depending on in which direction the ultrasonic wave is sent, the received signal will be referred to in the following table with $y_{AB}(t)$ or $y_{BA}(t)$:

| Ultrasonic transducer A | Ultrasonic transducer B | Received signal |
| --- | --- | --- |
| Transmitter | Receiver | $y_{AB}(t)$ |
| Receiver | Transmitter | $y_{BA}(t)$ |

The ultrasonic pulse produced by the one ultrasonic transducer is, due to reflection and refraction at material interfaces, for example, between the ultrasonic transducer and the measuring tube, scattered into innumerable wave portions, so that in the case of the other ultrasonic transducer, besides the main pulse, which follows the direct path (according to the refraction law of Snell), innumerable scatter waves arrive. Thus, the received signal includes besides the time limited main pulse a superimposed noise like signal, which corresponds to the sum signal of all scatter waves. This sum signal is also called a tube wave, although some fractions do not propagate exclusively in the tube, or pipe, wall (or transducer) but, instead, also through the medium.

Figure 1:
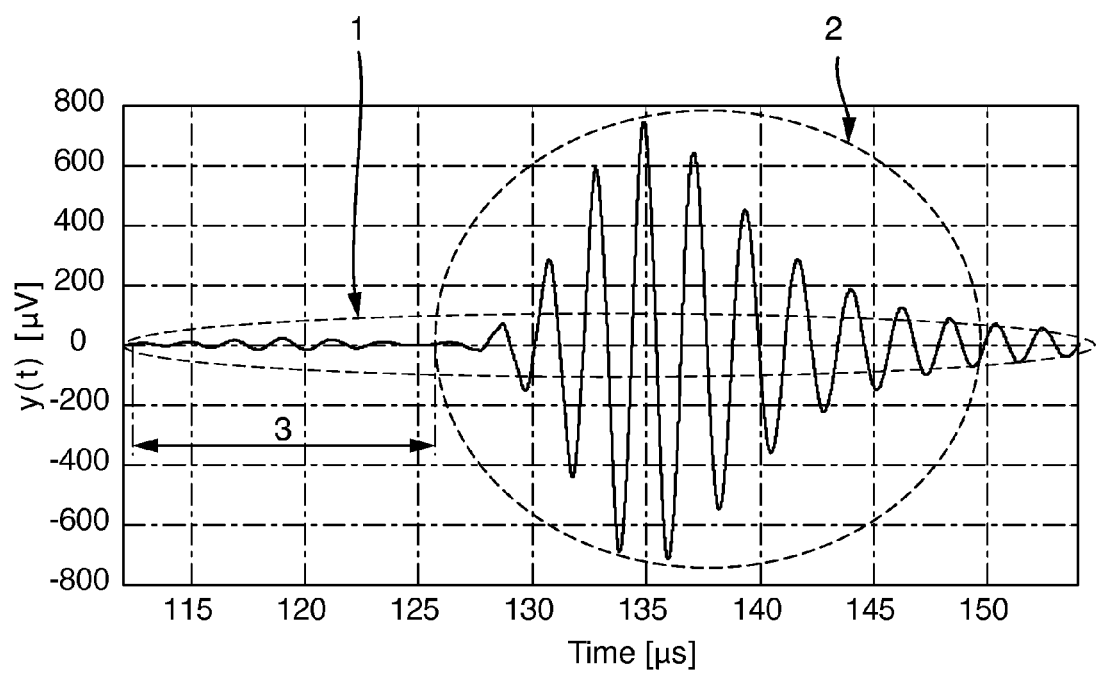
FIG. 1 is a illustration of a received signal having an ultrasound wanted signal and an ultrasound disturbance signal.

FIG. 1 shows the time curve of a received signal. First, there occurs a region of smaller amplitude, for instance, 10-30 µV. After, for instance, 130 µs, there begins the signal of the main pulse, thus of the actual wanted signal, which is required for evaluating the travel-time difference. Finally, there occurs a settling oscillation at, for instance, 145 µs, where, on the one hand, a signal portion arises from a post-pulse oscillation of the receiving ultrasound transducer and, on the other hand, a portion is the tube wave. For better understanding, the tube wave portion 1 and the main pulse portion 2 have been graphically distinguished. In the present invention, the terms, disturbance signal and tube wave, are used synonymously, the same being true for the terms, main wave and ultrasound wanted signal.

As one can see, the transmission of a part of the tube wave, which is transmitted directly via the measuring tube, occurs significantly faster than the transmission of the main signal. In the present case, the experimental conditions were selected in such a manner that a comparatively strong tube wave occurs.

The received signals of the two propagation directions can be expressed simplified by the equations $$y_{AB}(t) = n_{AB}(t) + x(t - 0.5 \cdot \Delta t)$$

$$y_{BA}(t) = n_{BA}(t) + x(t + 0.5 \cdot \Delta t) \quad (1)$$

wherein $n_{AB}(t)$, respectively $n_{BA}(t)$, represent the respective tube wave signals. Noise signals such as electromagnetic interference or foreign sounds are not taken into consideration, since these, as a rule, are much weaker than the tube wave signals.

The travel time of the main pulse x(t) is increased or reduced by $0.5 \cdot \Delta t$, depending on whether it is propagated with or against the flow of the medium.

The travel-time difference $\Delta t$ is the measured variable, with which the flow is determined. Since the tube waves superimpose on the main pulse, they also influence the estimation of the travel-time difference $\Delta t$. This means that the measurement error of an ultrasonic, flow measuring device depends on, among other things, the ratio of the amplitudes of the main pulse and the tube waves. This ratio is also referred to as the signal to noise ratio (SNR). The measurement error caused by the tube wave is, in such case, dependent on the temperatures of the medium and the measuring tube (transducer).

Investigations have shown that the measurement error changes more strongly and faster with the temperature, in case the two tube waves differ. It was possible to show that the difference is caused by sound waves, which are still present in the measuring tube and in the medium from the preceding individual measurement. Referred to as an individual measurement, in such case, is the above described procedure, in the case of which the one ultrasonic transducer transmits an ultrasonic pulse and the other ultrasonic transducer transduces the incoming ultrasonic, signal back into an electrical signal, which is amplified and logged in a certain time interval for further processing.

These longlived disturbance sound waves, respectively tube waves, represented in the following equations by $\bar{n}_{AB}(t)$, respectively $\bar{n}_{BA}(t)$, are different for the two propagation directions. A possible explanation for this could lie therein, that they do not propagate exclusively in the measuring tube, but, instead, sectionally also through the flowing medium. The tube wave signals of equation (1) can be represented according to the following equation as the sum of the flow independent tube wave signal $n_P(t)$ and the flow dependent and, consequently, different fractions $\bar{n}_{AB}(t)$, respectively $\bar{n}_{BA}(t)$.

$$n_{AB}(t)=n_P(t)+\bar{n}_{AB}(t)$$

$$n_{BA}(t)=n_P(t)+\bar{n}_{BA}(t) \qquad (2)$$

The fraction $n_P(t)$, thus tube waves with $\bar{n}_{AB}(t)=\bar{n}_{BA}(t)=0$, should be referred to as symmetric tube waves, because according to equation (2) the following holds:

$$n_{AB}(t)=n_{BA}(t)=n_P(t) \qquad (3)$$

Figure 3:
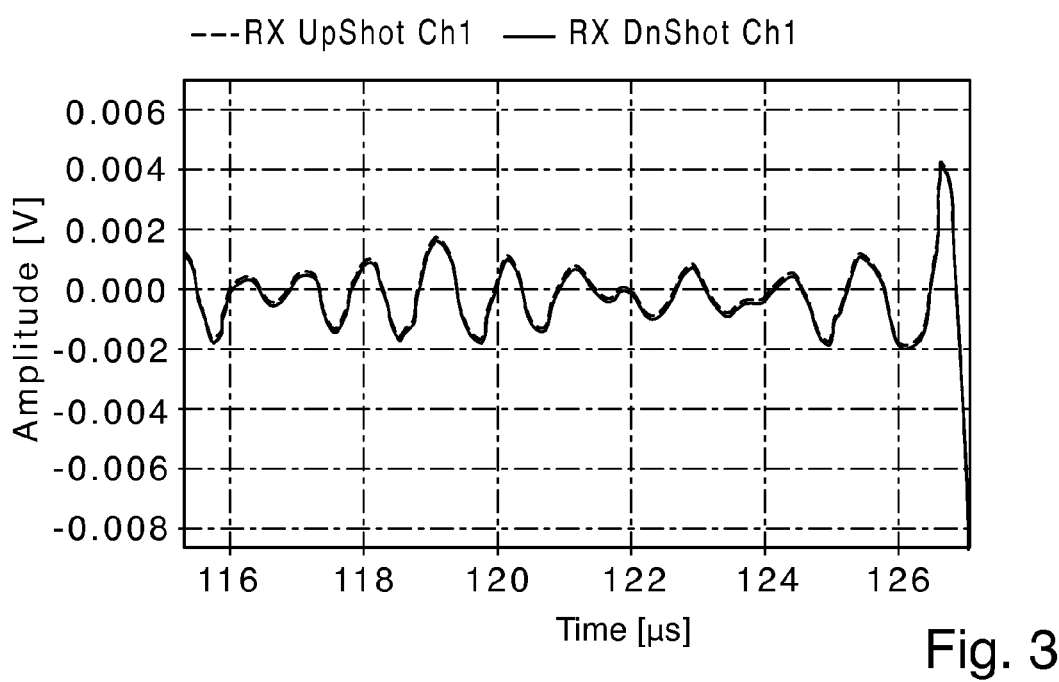
FIG. 3 is an illustration of two superimposed symmetric ultrasound disturbance signals.

The symmetric tube waves are shown in FIG. 3, in which the two waves $n_{AB}(t)$ and $n_{BA}(t)$ completely superimpose. The symmetric tube waves can be, for example, echos from preceding sound pulses, which, however, propagate exclusively outside of the measured medium, especially exclusively in the measuring tube. They are relatively frequent and enter into the measurement as background noise. Due to the fact that the temperature dependence of the velocity of sound of the measuring tube, which, for example, is composed of steel, is much less than that of the measured medium, for example, water, they cause only low measured value fluctuations within a greater temperature range of a number of degrees Kelvin.

Figure 2:
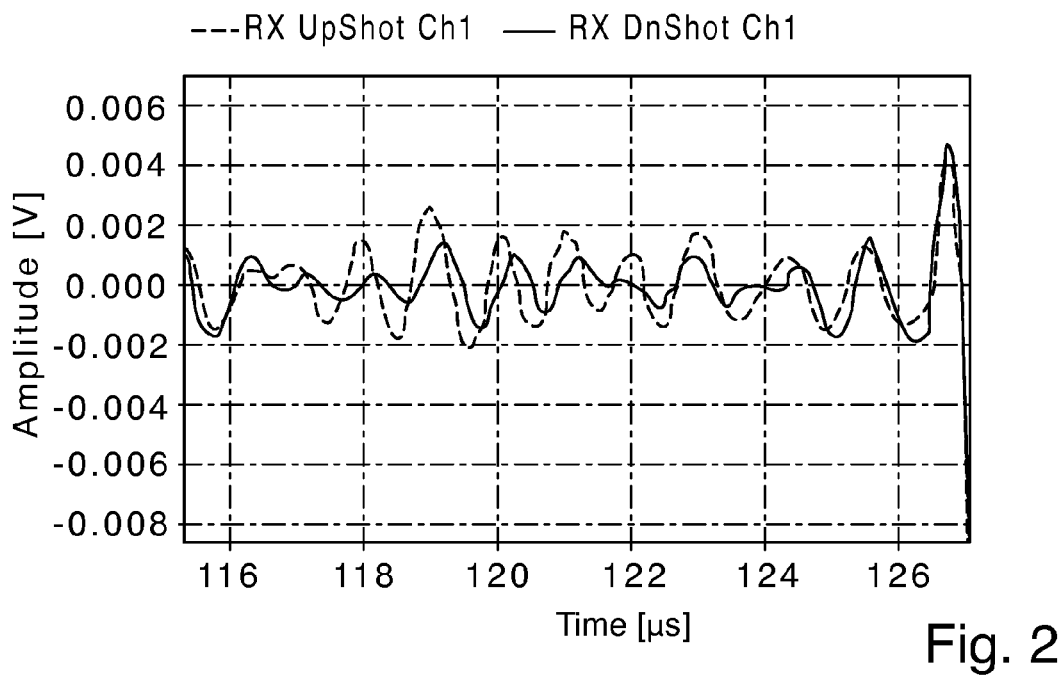
FIG. 2 is an illustration of an asymmetric ultrasound disturbance signal.

For asymmetric tube waves, $n_{AB}(t) \neq n_{BA}(t)$. This situation is shown in FIG. 2.

Figure 4:
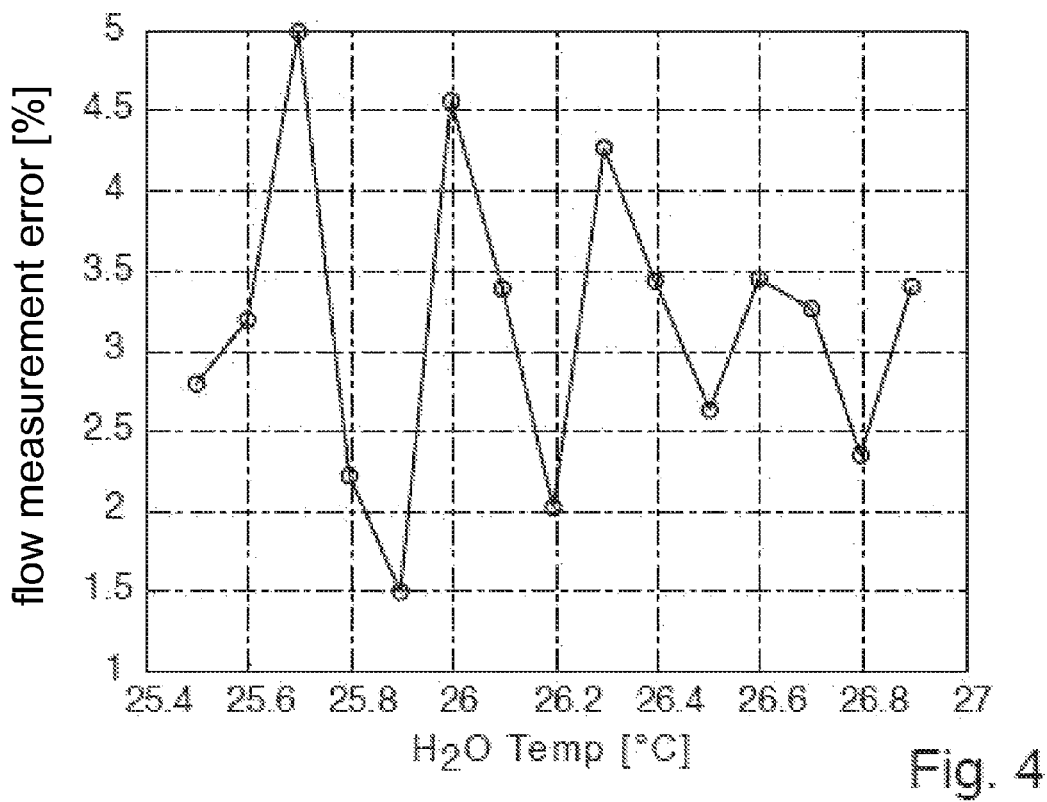
FIG. 4 shows a change of measurement error of asymmetric ultrasound disturbance signals as a function of temperature of the medium.
Figure 5:
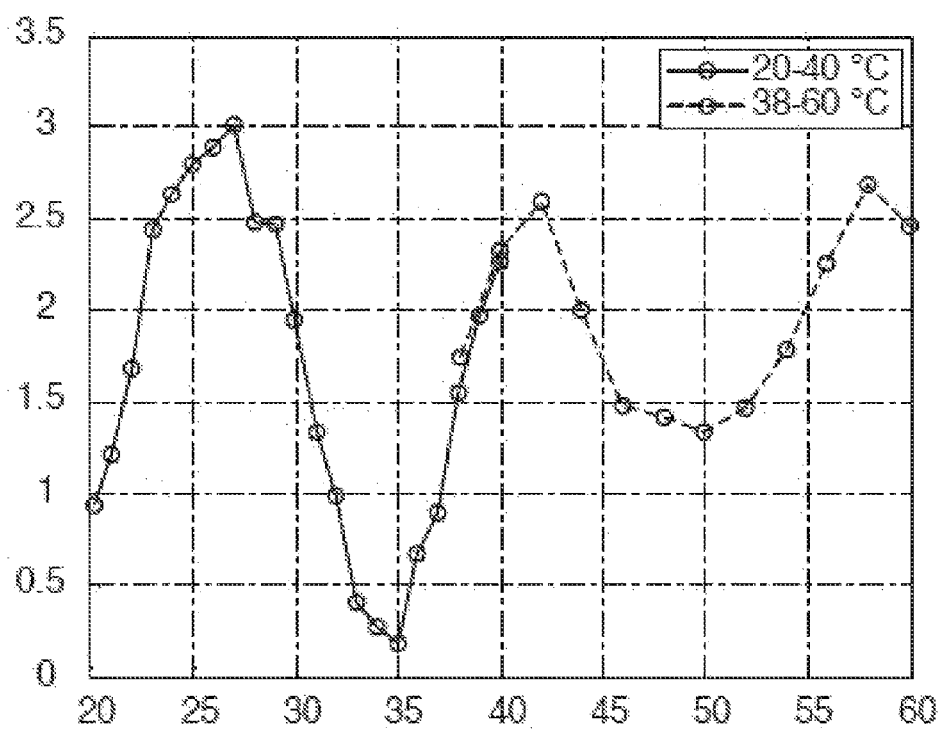
FIG. 5 shows a change of measurement error of symmetric ultrasound disturbance signals as a function of temperature of the medium.

The above mentioned dependence of the measurement error comes about due to the fact that the tube wave fractions $\bar{n}_{AB}(t)$ and $\bar{n}_{AB}(t)$ partially propagate through the medium, whose velocity of sound in comparison with the velocity of sound of the metal measuring tube changes with the temperature, as a rule, much more strongly. FIG. 4 shows measuring with strong measurement error fluctuations within smallest temperature changes due to asymmetric tube waves. Symmetric tube waves bring about measurement errors, which change much more slowly with temperature, such as the measurements in FIG. 5 show. Note the different temperature scales of the two curves. The phenomenon of the temperature changeability of the asymmetric tube waves has not been recognized in the past. It even seems that these asymmetric tube waves have not previously been detected and identified as such. They occur comparatively rarely, they can, however, cause a considerable disturbance signal fraction. These asymmetric tube waves occur also in the case of inline ultrasonic flow devices, in the case of which the ultrasonic transducers are embodied to contact the medium and the ultrasonic signal travels by multireflection on the tube inner wall from one ultrasonic transducer to the other. Also here the mentioned asymmetric tube waves occur, which, in this case, come only from the current transmission signal and not from the preceding one. Such ultrasound disturbance signals cannot be compensated by pulse sequence modulation.

Marked asymmetric tube waves were especially observed in the case of using low frequency clamp-on ultrasonic transducers (e.g. 0.5 MHz center frequency) in two-traverse mode on metal tubes. Determining the SNR for diagnostic purposes without distinguishing symmetric/asymmetric tube waves is already implemented in measuring devices of the applicant and is considered state of the art.

An essential aspect of the present invention lies in determining the fraction of asymmetric tube waves. Additionally, a determination concerning the influence on the measured value is made.

The fraction of the asymmetric tube waves can be estimated by comparing the received signals $y_{AB}(t)$ and $y_{BA}(t)$ in a time interval 3 with determined limits M and N before the main pulses. This is shown in detail in FIG. 6. In this region, the tube waves $n_{AB}(t)$ and $n_{BA}(t)$ are not superimposed by the main signal. The limits, which in the present example lie between M=20 and N=302, can, depending on nominal diameter of the measuring tube, be completely different— they can, however, be determined in the context of a measurement.

Figure 6:
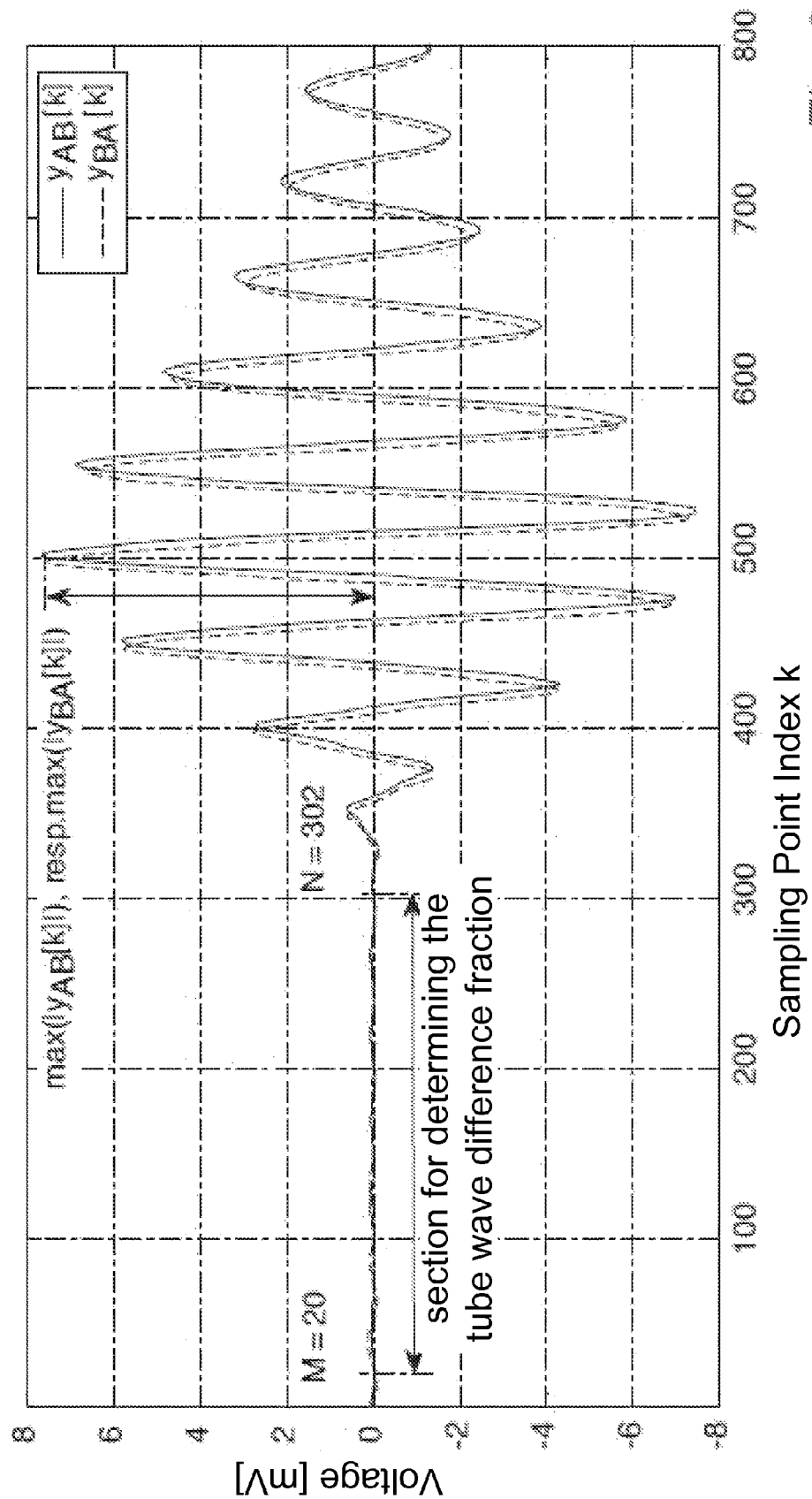
FIG. 6 shows the superpositioning of two ultrasonic signals comprising an ultrasound wanted signal region and a preceding disturbance signal region.

Used as comparison operation between the tube waves illustrated in FIG. 6, wherein one propagates with and one against the flow of the medium, is the mean squared error. This is used according to the following equation to form a ratio with the product of the maximum amplitudes of the main pulses.

Note that in the following equations, instead of the time variable t, the sample index k suitable for the description of time discrete (sampled) signals is used.

$$SDNR = 10 \cdot \log10\left( \frac{2 \cdot \max(|y_{AB}[k]|) \cdot \max(|y_{BA}[k]|)}{\frac{1}{N-M+1} \cdot \sum_{k=M}^{N} (y_{AB}[k] - y_{BA}[k])^2} \right) \qquad (4)$$

The variable SDNR is, analogously to the SNR, a ratio of wanted signal power—in this case, the product of the maximum amplitudes of the main pulses—to noise power (disturbance signal power), which, in this case, corresponds to the mean squared difference of the tube wave signals. This difference is calculated in the sampling interval with the limits M and N according to equation (4). The SDNR variable can be used as quality criterion in the sense the present invention.

Thus, for example, an SDNR value of less than 25 dB as quality criterion is graded "corrupted" for an individual measured value corrupted by disturbance signals.

An SDNR value of greater than 50 dB as quality criterion is, in contrast, graded "reliable" for an individual measured value corrupted only to a small degree by disturbance signals.

SDNR is to be understood as information relative to the measurement error and is the acronym of the therewith newly defined concept "signal difference to noise ratio". The rapid, temperature related measurement error fluctuation of FIG. 4 decreases with rising SDNR.

The difference of the tube wave signals can be written as follows:

$$\Delta n[k]=n_{AB}[k]-n_{BA}[k]=(n_P[k]+\bar{n}_{AB}[k])-(n_P[k]+\bar{n}_{BA}[k])=\bar{n}_{AB}[k]-\bar{n}_{BA}[k],$$

wherein the symmetric tube wave fraction drops out.

In closing, it is noted again that, in these explanations, stochastic noise signals, such as, electromagnetic interference or foreign sound, are not taken into consideration, since they are, as a rule, much weaker than the tube wave signals and additionally have no systematic (e.g. temperature dependent) influence on the measured value, so that such influence cannot be eliminated by sufficiently long averaging.

The SDNR value can after its calculation be output on the display unit and provides a user with a meaningful estimate relative to the reliability of the main signal Determining the extent of the temperatures sensitive disturbance signals, thus of the asymmetric tube waves, as measurement error variable enables the end-user to have a validation of the reliability its ascertained flow values. This validation can be performed by an evaluating unit and displayed, for example, at an output unit either acoustically or visually.

Since the asymmetric tube waves are especially temperature sensitive, they form an error source, whose extent must be determined in short intervals, preferably every 1-20 seconds, for a better validation of the measurement results.

Alternatively or supplementally, a verification can occur on the evaluating unit of the flow measuring device concerning the reliability of the respective measurement signal sequence, wherein only those measurement signal sequences enter into the ascertaining of the flow value, in the case of which the extent of the asymmetric tube waves does not exceed a certain desired value.

Besides verifying the extent of the temperatures sensitive, asymmetric disturbance signals, the influence of these disturbance signals can also be reduced partially or completely by a modulation of the pulse repetition time.

The pulse repetition frequency (PRF) is the number of pulses sent per second. The ultrasonic flow measuring device sends a pulse with a fixed transmission pulse length and waits between the transmission pulses for the received signals. The time from the beginning of one transmission pulse to the beginning of the next transmission pulse is the pulse repetition time (PRT) and is the reciprocal of the pulse repetition frequency:

The time between transmission pulses is generally the receipt time. This is always smaller than the difference between the pulse repetition time and the transmission time and is sometimes supplementally limited by a so called dead time.

The pulse repetition time can be modulated step-wise, in order to compensate asymmetric tube waves formed from preceding transmission pulses.

The optimal values for the step width and the number of steps depend on the average period $T_C$ (=$1/F_C$) of the disturbance sound waves. $F_C$ is the center frequency of the disturbance sound waves. The pulse repetition time is varied in steps of length $T_C/20$ to $T_C/5$ in the range from $T_P$ to $T_P+N*T_C$, wherein $T_P$ corresponds to the minimum pulse repetition time and N lies between 4 and 10.

By modulating the pulse repetition time, the coherence between the main wave and the mentioned, very slowly decaying, disturbance sound waves is lost on average. The terminology, modulating the pulse repetition time, means the step-wise changing of the pulse repetition time in a certain range. Measurements with a pulse repetition time modulation of 20 steps and a step width $T_{WT}$ of $1/(5 \cdot F_C)$ delivered good results (see FIG. 7). The pulse repetition time can be changed after each or after a number of individual measurements. In such case, it is important that the pulse repetition time modulation occurs symmetrically relative to the transmission direction.

Modulation width is the minimal difference between the maximum pulse repetition time and the minimum pulse repetition time. This amounts to between 4 and 10 times the average period of the disturbance sound waves. Step width of the variation of the pulse repetition time is less than the period of the disturbance sound waves, preferably ⅕ to 1/20.

The range of the average period of the disturbance sound waves amounts to between 0.1 µs and 10 µs.

Figure 7:
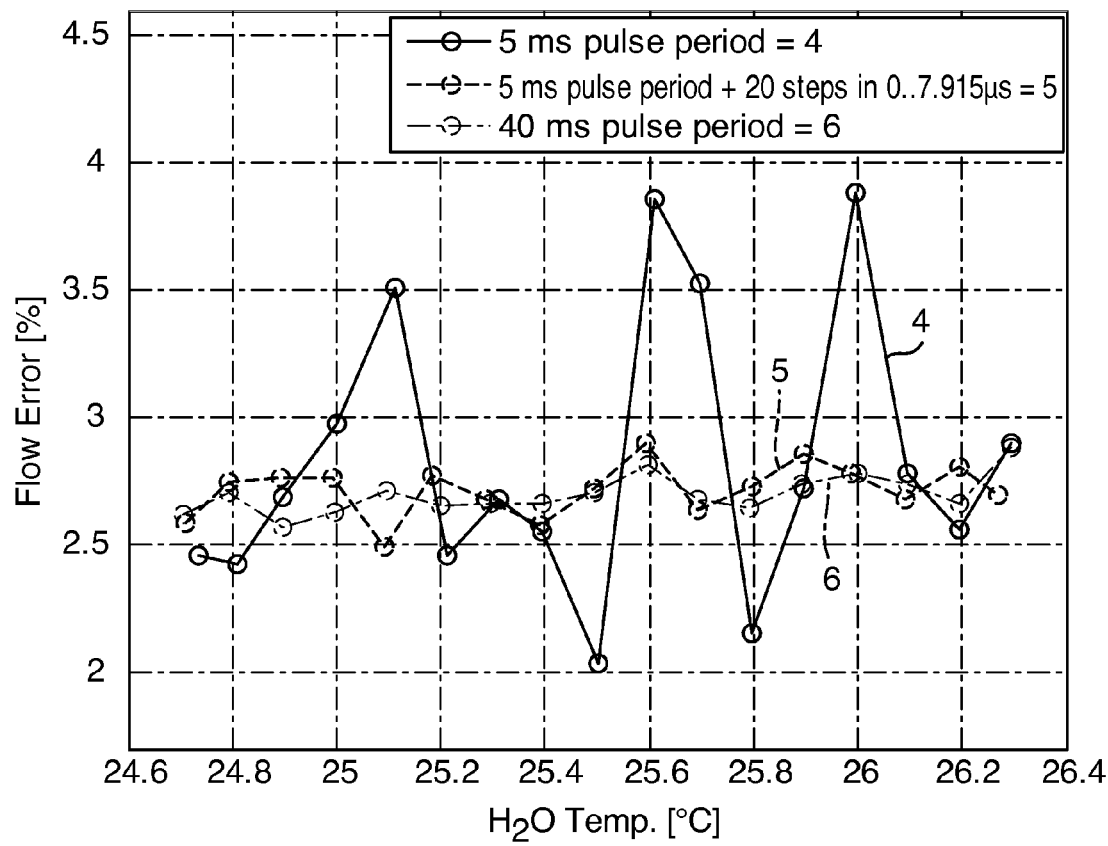
FIG. 7 shows the reduction of temperature dependence of asymmetric ultrasound disturbance signals by pulse sequence modulation.

In FIG. 7, disturbance signals are registered under analog measuring conditions. In such case, 0.5 MHz clamp-on ultrasonic transducers with a stainless steel measuring tube (88.9*5.5 mm) were utilized. The measured medium was water with a flow of 12 l/s. The measurement curve 4 shows measurement error fluctuations of the ultrasound disturbance signal brought about by asymmetric tube waves. As one can see based on the measurement curve 5, reduction of the temperature related measurement error fluctuations is obtained by means of pulse repetition time modulation Additionally, for comparison, measurement curve 6 is for measuring with a constant and very long pulse repetition time of 40 ms. By lengthening the pulse repetition time, disturbance signals, which come from preceding transmission pulses, have decayed to the extent that the current received signal is scarcely disturbed at all. However, influencing the pulse repetition time are central parameters such as the measuring rate, the measurement noise and the response time of the flow measuring device. In this regard an as short as possible pulse repetition time is desirable, yet not so short that the interferences of the preceding transmission pulses corrupt the measured value. This can be achieved, such as shown in the measurement curve 5, by the pulse repetition time modulation.

It is, consequently, not attempted to avoid the interference waves, but, instead, to minimize their influence on the measured value by canceling the coherence between main- and interference waves.

The invention claimed is:

1. A method for verifying the reliability of ascertained measurement data of an ultrasonic, flow measurement made according to the travel-time difference method, comprising the steps of:
   transmitting and receiving ultrasonic signals inclined in or counter to a flow direction of a measured medium using an ultrasonic flow measuring device with at least two ultrasonic transducers;
   registering a first ultrasound disturbance signal within a first time window before receiving a first ultrasound wanted signal, which essentially propagates through the measured medium between the transducers, the first ultrasound disturbance signal propagates at least partially in the measured medium between the ultrasonic transducers; and
   registering a second ultrasound disturbance signal within a second time window before receiving a second ultrasound wanted signal, which propagates essentially through the measured medium between the transducers, the second ultrasound disturbance signal propagates at least partially in the measured medium between the ultrasonic transducers, wherein:
   the first and second ultrasound wanted signals are associated respectively with two ultrasonic signals, which are sent in opposing directions through the medium;
   ascertaining a quality criterion for evaluating the measurement uncertainty of a measured value proportional to the travel-time difference ascertained from the first and second ultrasound wanted signals; and
   the ascertaining of the quality criterion includes a difference forming between the first ultrasound disturbance signal and the second ultrasound disturbance signal.

2. The method as claimed in claim 1, wherein:
a desired value for a quality criterion is predetermined and, to the extent that the desired value is subceeded, the measurement uncertainty is evaluated as too high.

3. The method as claimed in claim 1, wherein:
the quality criterion is ascertained by a comparison operation, which includes ascertaining the mean squared difference between the first and second ultrasound disturbance signals.

4. The method as claimed in claim 1, wherein:
the quality criterion is ascertained by a comparison operation, which includes forming the quotient of the product of the maximum amplitudes of the ultrasound wanted signals and the mean squared difference of the first and second ultrasound disturbance signals.

5. The method as claimed in claim 1, wherein:
the first and second time windows are equally large.

6. An ultrasonic flow measuring device, comprising:
at least two ultrasonic transducers and an evaluating apparatus, which is embodied for verifying the reliability of ascertained measurement data of an ultrasonic, flow measurement made according to the travel-time difference method, the method comprising: a method for verifying the reliability of ascertained measurement data of an ultrasonic, flow measurement made according to the travel-time difference method, comprising the steps of: transmitting and receiving ultrasonic signals inclined in or counter to a flow direction of a measured medium using an ultrasonic flow measuring device with at least two ultrasonic transducers; registering a first ultrasound disturbance signal within a first time window before receiving a first ultrasound wanted signal, which essentially propagates through the measured medium between the transducers, the first ultrasound disturbance signal propagates at least partially in the measured medium between the ultrasonic transducers; and registering a second ultrasound disturbance signal within a second time window before receiving a second ultrasound wanted signal, which propagates essentially through the measured medium between the transducers, the second ultrasound disturbance signal propagates at least partially in the measured medium between the ultrasonic transducers, wherein: the first and second ultrasound wanted signals are associated respectively with two ultrasonic signals, which are sent in opposing directions through the medium; ascertaining a quality criterion for evaluating the measurement uncertainty of a measured value proportional to the travel-time difference ascertained from the first and second ultrasound wanted signals; and the ascertaining of the quality criterion includes a difference forming between the first disturbance signal and the second disturbance signals.

7. The ultrasonic flow measuring device as claimed in claim 6, wherein:
said ultrasonic flow measuring device has a display unit for output of a currently ascertained measurement uncertainty.

* * * * *